(12) United States Patent
Takeuchi et al.

(10) Patent No.: US 6,952,292 B2
(45) Date of Patent: Oct. 4, 2005

(54) IMAGE READING APPARATUS AND METHOD OF SUPPORTING IMAGE READING UNIT

(75) Inventors: Yukitoshi Takeuchi, Kanagawa (JP); Shigeru Kawasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 693 days.

(21) Appl. No.: 09/918,047

(22) Filed: Jul. 30, 2001

(65) Prior Publication Data

US 2002/0054380 A1 May 9, 2002

(30) Foreign Application Priority Data

Jul. 31, 2000 (JP) ........................................ 2000-230891

(51) Int. Cl.[7] .............................................. H04N 1/04
(52) U.S. Cl. ...................................... 358/497; 358/474
(58) Field of Search ................................ 358/497, 494, 358/474, 483, 482, 487, 505, 506, 514, 513, 512, 471, 496; 399/211, 118, 379, 380; 250/208.1, 234–236; 355/67, 68, 41; 382/312, 318, 319

(56) References Cited

U.S. PATENT DOCUMENTS

| | | | | |
|---|---|---|---|---|
| 5,194,898 A | * | 3/1993 | Costrop et al. | 358/497 |
| 5,801,851 A | * | 9/1998 | Sheng | 358/497 |
| 6,026,261 A | * | 2/2000 | Peng | 399/211 |
| 6,091,516 A | * | 7/2000 | Chang et al. | 358/474 |
| 6,285,441 B1 | * | 9/2001 | Takahara | 355/67 |
| 6,330,084 B1 | * | 12/2001 | Chiang | 358/497 |
| 6,717,702 B1 | * | 4/2004 | Yamauchi et al. | 358/497 |
| 6,801,343 B1 | * | 10/2004 | Sheng | 358/474 |

* cited by examiner

Primary Examiner—Cheukfan Lee
(74) Attorney, Agent, or Firm—Morgan & Finnegan, L.L.P.

(57) ABSTRACT

An image reading apparatus includes a spring (15) provided at one end of a reading unit (11) and adapted to bias the reading unit (11) toward an original glass table (10), and a sensor holder (12) provided on a guide rail (14) to be pivotal about it and adapted to hold the reading unit (11) through the spring (15).

6 Claims, 15 Drawing Sheets

F I G. 3
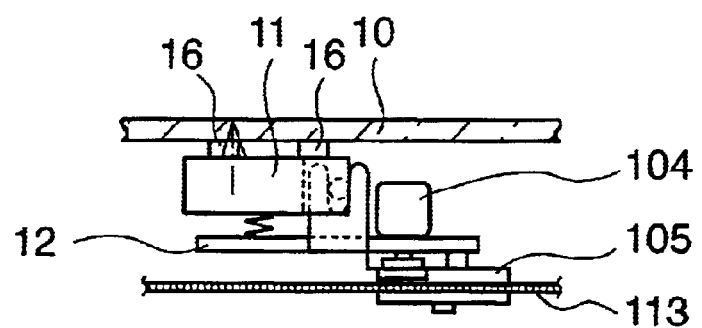

IMAGE READING APPARATUS AND METHOD OF SUPPORTING IMAGE READING UNIT

FIELD OF THE INVENTION

The present invention relates to an image reading apparatus, e.g., a scanner, copying machine, or facsimile apparatus, for reading the image of an original, and a method of supporting an image reading unit.

BACKGROUND OF THE INVENTION

As shown in FIGS. 10 to 12, reference symbol P denotes a reading original P placed on an original glass table 100. The image of the original is read by scanning a reading unit 101 parallel to the original glass table 100. As shown in FIG. 6, three color LEDs 101R, 101G, and 101B serving as the light sources for irradiating the original, a rod lens array 101L for causing light reflected by the original to form an image on the light-receiving element of an image sensor 101S, and the image sensor 101S are built into the reading unit 101. Color separation reading is performed by sequentially turning on the three color light sources by switching operation and reading light of respective colors reflected by the original with the image sensor 101S.

Reference numeral 111 denotes a frame serving also as an outer cover. In addition to the original glass table 100 and reading unit 101, a rail 112 for guiding travel of the reading unit 101, a control board, a power supply, and the like are arranged in the frame 111.

Spacers 102 made of a highly slidable material, e.g., POM, are fixed to the two ends in the main scanning direction of the upper surface of the reading unit 101. Support shafts 101a and 101b respectively arranged near the ends in the main scanning direction of the reading unit 101 are supported by U-shaped portions 103a and 103b on a sensor holder 103 to be vertically movable, and are biased upward by springs 107a and 107b fixed on the sensor holder 103. Consequently, the spacers 102 are in contact with the lower surface of the original glass table 100, so the reading unit 101 scans the original while maintaining a constant distance between the glass surface and the light-receiving surface of the image sensor 101S.

The sensor holder 103 has slider portions 103c and 103d which slide with respect to the rail 112. The slider portions 103c and 103d are made of a material such as POM, in the same manner as the spacers 102.

As shown in detail in FIGS. 13 to 15, a pulse motor 104 serving as a transmission mechanism for transmitting a driving force to the reading unit 101 and as a driving source, a gear train for decelerating rotation of the pulse motor 104, a driving pulley 105 with a tooth portion 105a corresponding to the spiral of a driving wire 113 (to be described later) and to which rotation from the motor is transmitted through the gear train, and an idle pulley 106 are rotatably arranged on the sensor holder 103.

The reading unit 101 is connected to the control board on the main body through a cable (not shown) and receives power and a driving signal from it and sends an image signal to it.

The rail 112 for guiding travel of the reading unit 101 is stationarily placed on the frame 111. One end 113a of the driving wire 113 is fixed to the reading terminal end of the apparatus frame 111. The driving wire 113 is wound around the driving pulley 105 on the reading unit 101, is looped on the idle pulley 106, and is fixed to the reading start end of the apparatus frame 111 through a spring 114.

When the driving wire 113 is set in the above manner, the moment indicated by arrows A acts on the reading unit 101, so the slider portions 103c and 103d on the sensor holder 103 abut against the rail 112.

In the inoperative state, the reading unit 101 usually waits at the home position on the reading start end. Upon reception of a reading instruction from a computer connected to it, the reading unit 101 starts reading by rotation of the motor, scans a white reference plate arranged between the home position of the apparatus and the original reading start position to generate shading correction data, and reads the image on the original starting from the reading start position.

Rotation of the motor is decelerated through the gear train, and is transmitted to the driving pulley 105. Usually, the stepping angle of the motor, the reduction ratio of the gear, and the outer diameter of the driving pulley are determined such that the reading unit 101 moves for a distance corresponding to one subscanning line in response to a plurality of driving pulses supplied to the motor. When the motor rotates in the forward direction, the driving pulley 105 takes up the wire, and accordingly the reading unit 101 moves in the scanning direction. When the motor rotates in the reverse direction, the reading unit 101 moves toward the home position.

The above prior art has the following problems.

As described above, the reading unit 101 is biased toward the original glass table 100 by the springs 107a and 107b arranged at the two ends of the sensor holder 103 which is supported substantially at its center by the guide rail 112. These springs 107a and 107b must be able to uniformly urge the right and left ends of the reading unit 101 against the original glass table 100.

From the viewpoint of assembly, the springs 107a and 107b are preferably identical, so an error in attaching can be prevented.

Due to the arrangement of the apparatus, however, it is difficult to maintain an urging pressure against the original glass table 100 uniform on the right and left sides by using the identical springs.

For example, in the above case, since that side of the sensor holder 103 which has the driving transmitting system is heavier than the other side thereof with respect to the guide rail 112, the sensor holder 103 is undesirably tilted. To uniformly urge the reading unit 101 under this condition, the load of the spring on the driving transmission system side must be increased. Also, tilt itself of the sensor holder 103 poses a problem.

SUMMARY OF THE INVENTION

The present invention has been made in order to solve the problems of the prior art described above, and has as its object to provide a high-quality image reading apparatus in which the scanning stability of an image reading unit can be increased, and a method of supporting the image reading unit.

In order to achieve the above object, according to the present invention, there is provided an image reading apparatus with an image reading unit for reading image information of an original placed on one surface of an original table by scanning along the other surface of the original table, and a guide shaft provided at a position that divides the image reading unit into two regions and adapted to guide the image reading unit in a scanning direction, comprising a holding member extending along the image reading unit in a direction perpendicular to the guide shaft, adapted to hold the image reading unit at two ends thereof, and pivotal about the guide shaft, and biasing means, provided between the image reading unit, at one of the two regions thereof, and the holding member, for biasing the image reading unit through the holding member toward the original table over the two regions.

According to the present invention, there is provided a method of supporting an image reading unit for reading image information of an original placed on one surface of an original table in an image reading apparatus by scanning along the other surface of the original table, comprising the steps of holding the image reading unit at two ends of a holding member, extending along the image reading unit in a direction perpendicular to a guide shaft provided at a position that divides the image reading unit into two regions, and pivotal about the guide shaft, while guiding the image reading unit in a scanning direction with the guide shaft, and biasing the image reading unit through the holding member toward the original table over the two regions with biasing means provided between the image reading unit, at one of the two regions thereof, and the holding member.

Preferably, the holding member urges the other region of the image reading unit toward the original table by a biasing force of the biasing means which acts on one region of the image reading unit, and lever operation of the guide shaft.

Preferably, one region of the image reading unit is supported to be movable pivotally and perpendicularly by said holder member and the other region of the image reading unit is pivotally supported by said holding member.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 3 is a sectional view taken along the line II—II of FIG. 1;

DETAILED DESCRIPTION OF THE PREFERRED EMBODIMENTS

Figure 1:
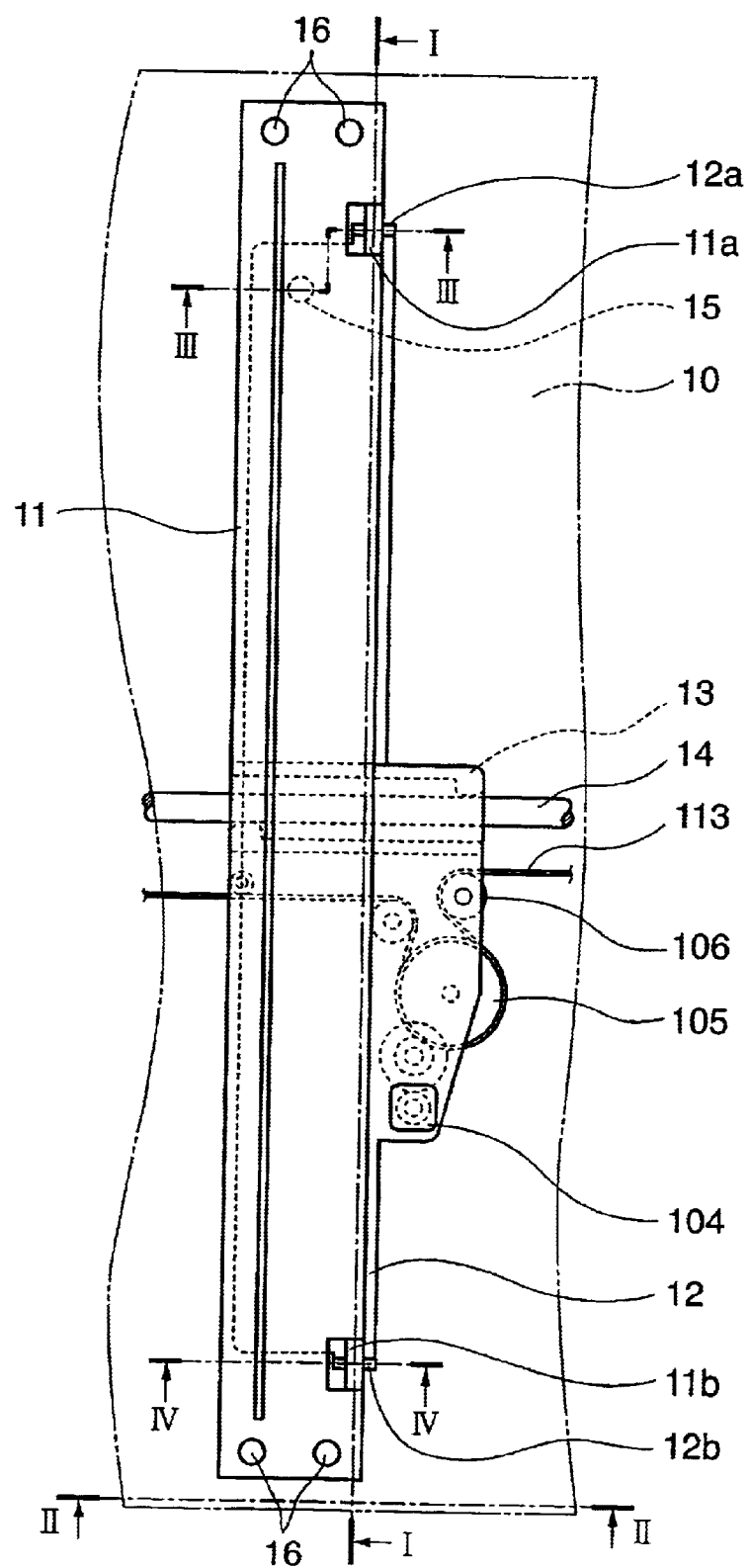
FIG. 1 is a plan view showing the main part of a reading unit in an image reading apparatus according to an embodiment of the present invention.
Figure 2:
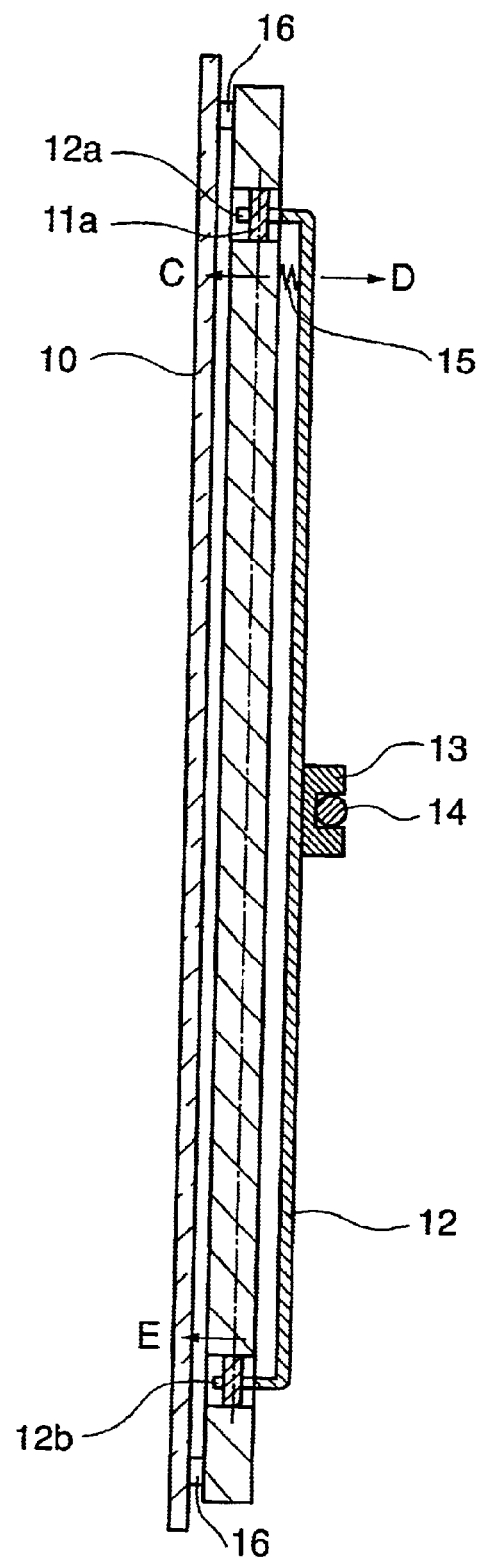
FIG. 2 is a sectional view taken along the line I—I of FIG. 1.

The preferred embodiment of the present invention will be described in detail with reference to the accompanying drawings. Note that the sizes, materials, and shapes of the constituent components described in the embodiment, the positions thereof relative to each other, and the like should be changed as required in accordance with the arrangement and various types of conditions of an apparatus to which the present invention is to be applied, and do not limit the scope of the invention to the following embodiment.

The schematic arrangement of an image reading apparatus will be described with reference to FIGS. 1 to 5. FIGS. 1 to 5 are views showing the main part of an image reading apparatus according to an embodiment, and particularly the schematic arrangement of an image reading unit. Constituent components that are identical to those described in the prior art will be described by using the same reference numerals as in the prior art.

Image information of an original placed on an original glass table 10 is read by scanning an (image) reading unit 11 parallel to the original glass table 10.

Figure 6:
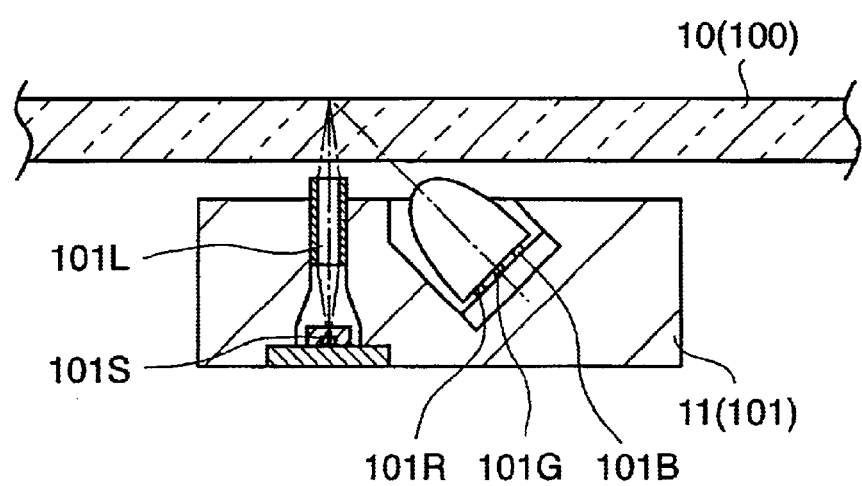
FIG. 6 is a sectional view showing an image sensor in detail.

As briefly shown in FIG. 6, three color LEDs 101R, 101G, and 101B serving as the light sources for irradiating the original, a rod lens array 101L for causing light reflected by the original to form an image on the light-receiving element of an image sensor 101S, and the image sensor 101S are built into the reading unit 11. Color separation reading is performed by sequentially turning on the three color light sources by switching operation and reading light of respective colors reflected by the original with the image sensor 101S.

In addition to the original glass table 10 and reading unit 11, a guide rail 14 serving as a guide shaft for guiding travel of the reading unit 11, a control board, a power supply, and the like are arranged in a frame serving also as an outer cover.

The characteristic arrangement of the embodiment of the present invention will be described.

Figure 4:
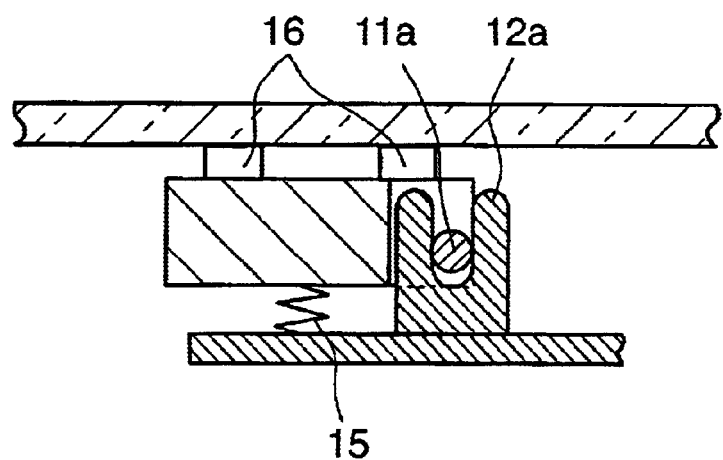
FIG. 4 is a sectional view taken along the line III—III of FIG. 1.

A sensor holder 12 serving as a holding member is swingably placed on the guide rail 14 through a slider portion 13 fixed to the sensor holder 12. A spring 15 serving as a biasing means is attached between one end (one region side) of the sensor holder 12 and the reading unit 11. A sensor support 12a to which the spring 15 is attached has a U shape, and a support shaft 11a in the reading unit 11 is inserted in it. Hence, as shown in FIG. 4, the reading unit 11 can freely move vertically at the sensor support 12a at one end of the sensor holder 12.

Figure 5:
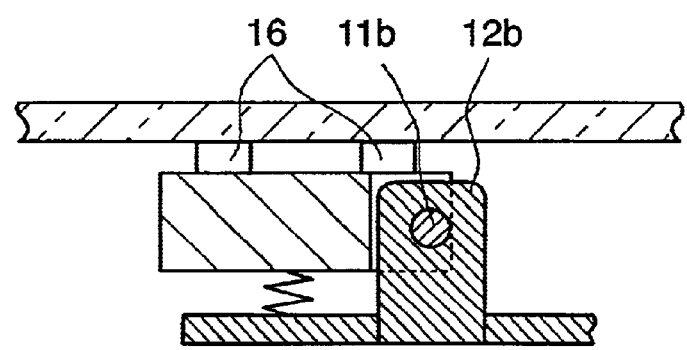
FIG. 5 is a sectional view taken along the line IV—IV of FIG. 1.

As shown in FIG. 5, a sensor support 12b at the other end (the other region side) of the sensor holder 12 axially supports a support shaft 11b of the reading unit 11 such that the support shaft 11b is free in only the rotational direction.

Spacers 16 made of a highly slidable material, e.g., POM, are fixed to the two ends in the main scanning direction of the upper surface of the reading unit 11, and the slider portion 13 is also made of a material such as POM, in the same manner as the spacers.

When the original glass table 10 is mounted on the reading unit 11 with the above arrangement, the support shaft 11a side of the reading unit 11 is biased by the biasing force of the spring 15 toward the original glass table 10 (arrow C).

At this time, the sensor holder 12 receives a downward reaction force from the reading unit 11 (arrow D). This reaction force pushes up the sensor support 12b at the other end of the sensor holder 12 and furthermore the support shaft 11b of the reading unit 11 at this end by the operation of a lever about the guide rail 14 as the fulcrum (arrow E). When the reading unit 11 abuts against the original glass table 10, it pivots about the support shaft 11b as the center to come into tight contact with the surface of the original glass table 10. Thus, the postures of the reading unit 11 and sensor holder 12 are maintained.

In this manner, the postures of the reading unit 11 and sensor holder 12 are uniquely determined, so that an urging pressure that is uniform on the right and left sides can be obtained. More specifically, unlike in the prior art, the postures are not determined by the position where the weight of the springs at the two ends and the unit as a whole is balanced. Therefore, variations in biasing force for the original glass table 10 are small, and the sensor holder 12 can maintain its parallel posture regardless of the balance of its own weight.

Since the reading unit 11 can scan the original while always maintaining a constant distance between the surface of the original glass table 10 and the light-receiving surface of the image sensor 101S, it can obtain a stable scanning performance.

Since the spring is used only at one end, the assembling efficiency is improved, and the cost can be reduced.

A driving system will be described. A pulse motor 104 serving as a transmission mechanism for transmitting a driving force to the reading unit 11 and as a driving source, a gear train for decelerating rotation of the pulse motor 104, a driving pulley 105 with a tooth portion 105a corresponding to the spiral of a driving wire 113 (to be described later) and to which rotation from the motor is transmitted through the gear train, and an idle pulley 106 are rotatably arranged on the sensor holder 12.

The reading unit 11 is connected to a control board on the main body through a cable (not shown) and receives power and a driving signal from it and sends an image signal to it.

Figure 7:
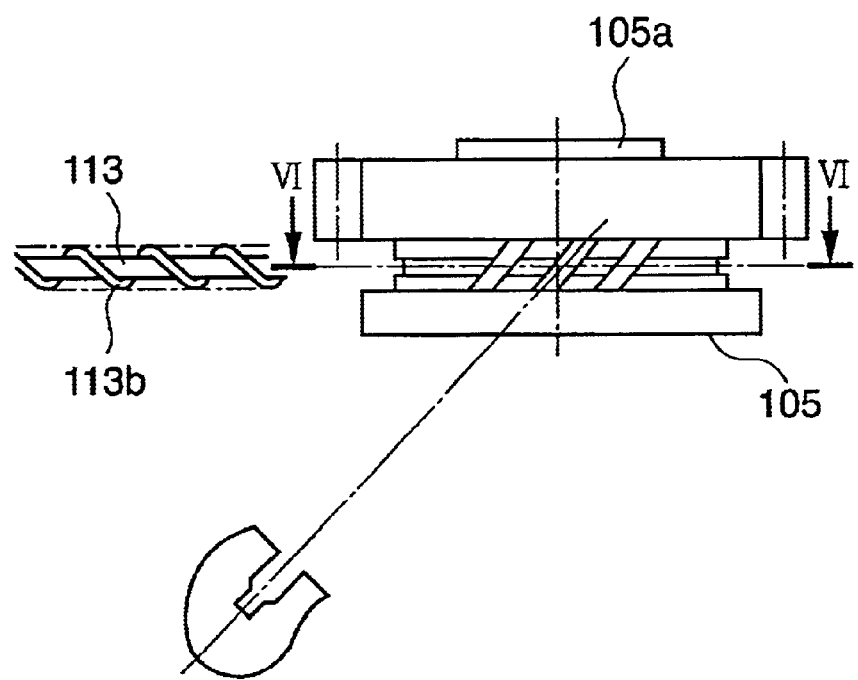
FIG. 7 is a front view showing a driving system in detail.
Figure 8:
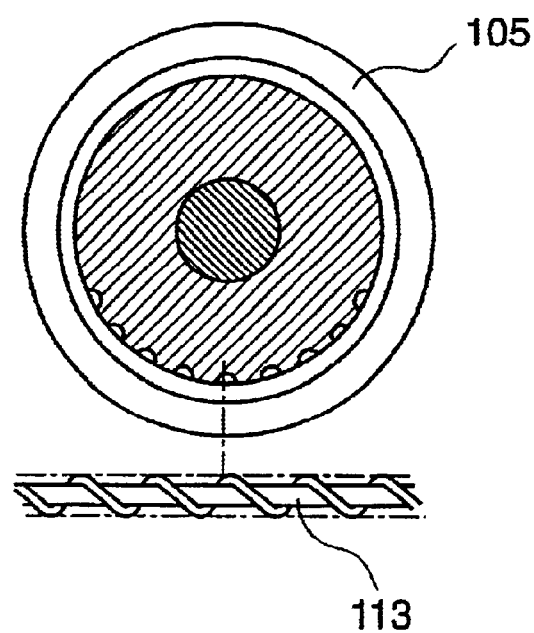
FIG. 8 is a sectional view taken along the line VI—VI of FIG. 7.

The guide rail 14 for guiding travel of the reading unit 11 is stationarily placed on the frame of the image reading apparatus. One end of the driving wire 113 is fixed to the reading terminal end of the apparatus frame. The driving wire 113 is obtained by forming a spiral 113b as shown in FIGS. 7 and 8 on an ordinary wire which is obtained by applying a resin coating on the surface of a core wire comprised of several thin steel wires that are twisted.

The driving wire 113 exhibits a function obtained by the thinness of an ordinary wire as well as the function of a toothed belt. More specifically, since the driving force is transmitted through meshing of the teeth, the driving wire 113 need not be wound around a pulley several times unlike an ordinary wire. The driving wire 113 is wound around the driving pulley 105 on the reading unit 11, is looped on the idle pulley 106, and is fixed to the reading start end of the apparatus frame through a spring.

When the driving wire 113 is set in the above manner, the reading unit 11 receives a moment, so the slider portion 13 on the sensor holder 12 abuts against the guide rail 14.

In the inoperative state, the reading unit 11 usually waits at the home position on the reading start end. Upon reception of a reading instruction from a computer connected to it, the reading unit 11 starts reading by rotation of the motor, scans a white reference plate arranged between the home position of the apparatus and the original reading start position to generate shading correction data, and reads the image on the original starting from the reading start position.

Rotation of the motor is decelerated through the gear train, and is transmitted to the driving pulley 105. Usually, the stepping angle of the motor, the reduction ratio of the gear, and the outer diameter of the driving pulley are determined such that the reading unit 11 moves for a distance corresponding to one subscanning line in response to a plurality of driving pulses supplied to the motor. When the motor rotates in the forward direction, the driving pulley 105 takes up the wire, and accordingly the reading unit 11 moves in the scanning direction. When the motor rotates in the reverse direction, the reading unit 11 moves toward the home position.

Figure 9:
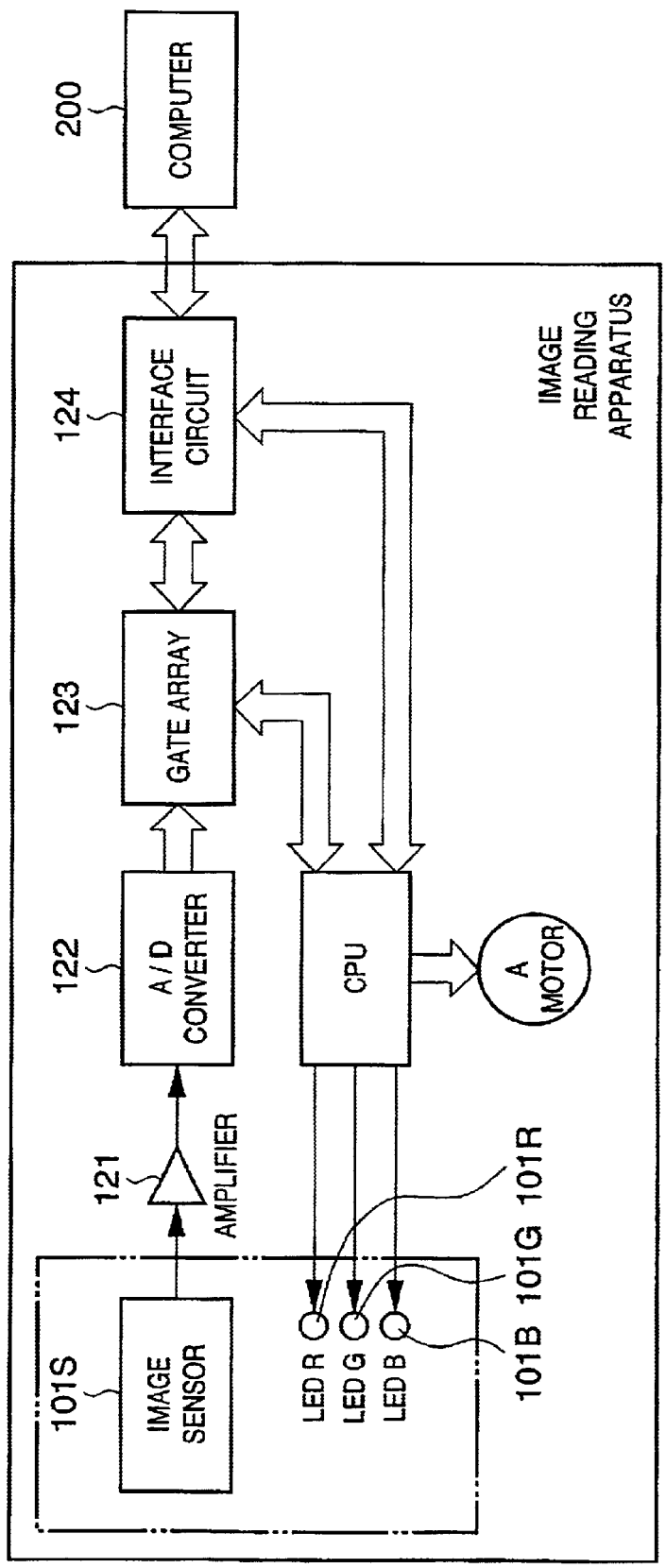
FIG. 9 is a block diagram of a control system.
Figure 10:
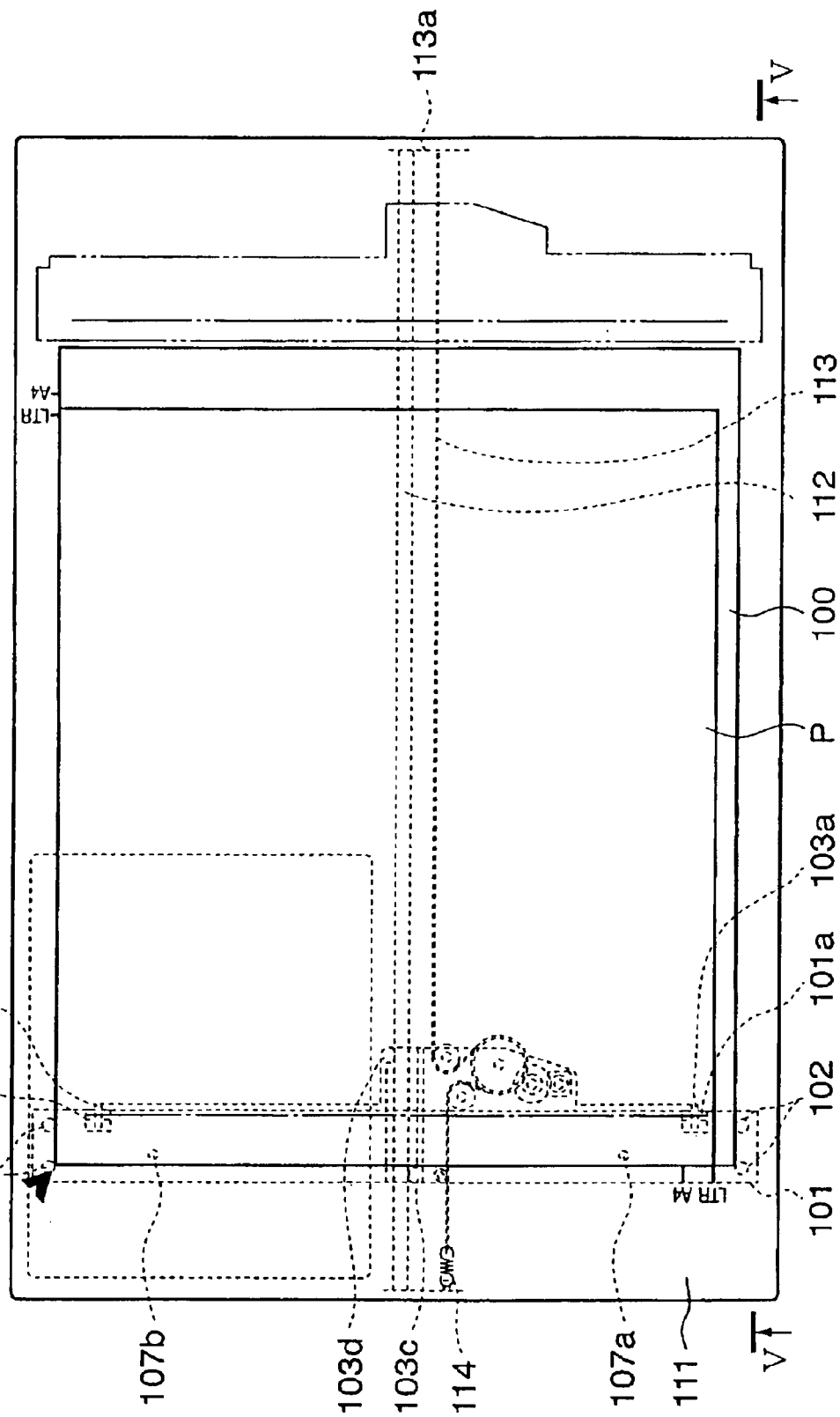
FIG. 10 is a plan view schematically showing a conventional image reading apparatus.
Figure 11:
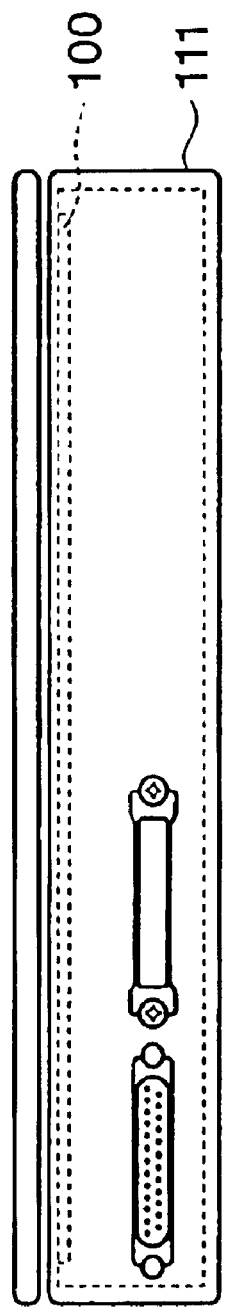
FIG. 11 is a side view schematically showing the conventional image reading apparatus.
Figure 12:
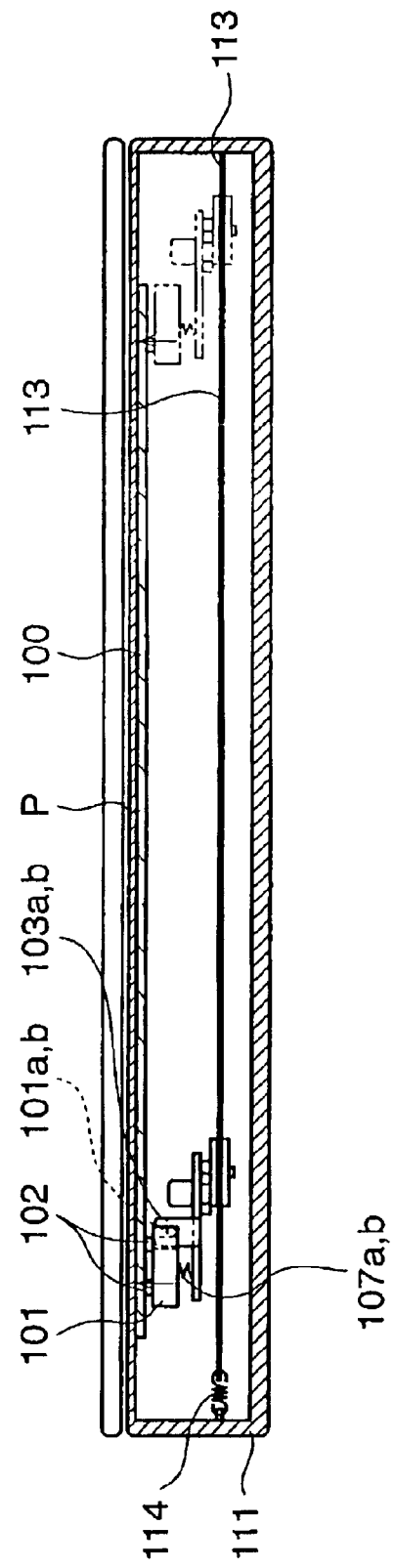
FIG. 12 is a sectional view taken along the line V—V of FIG. 10.
Figure 13:
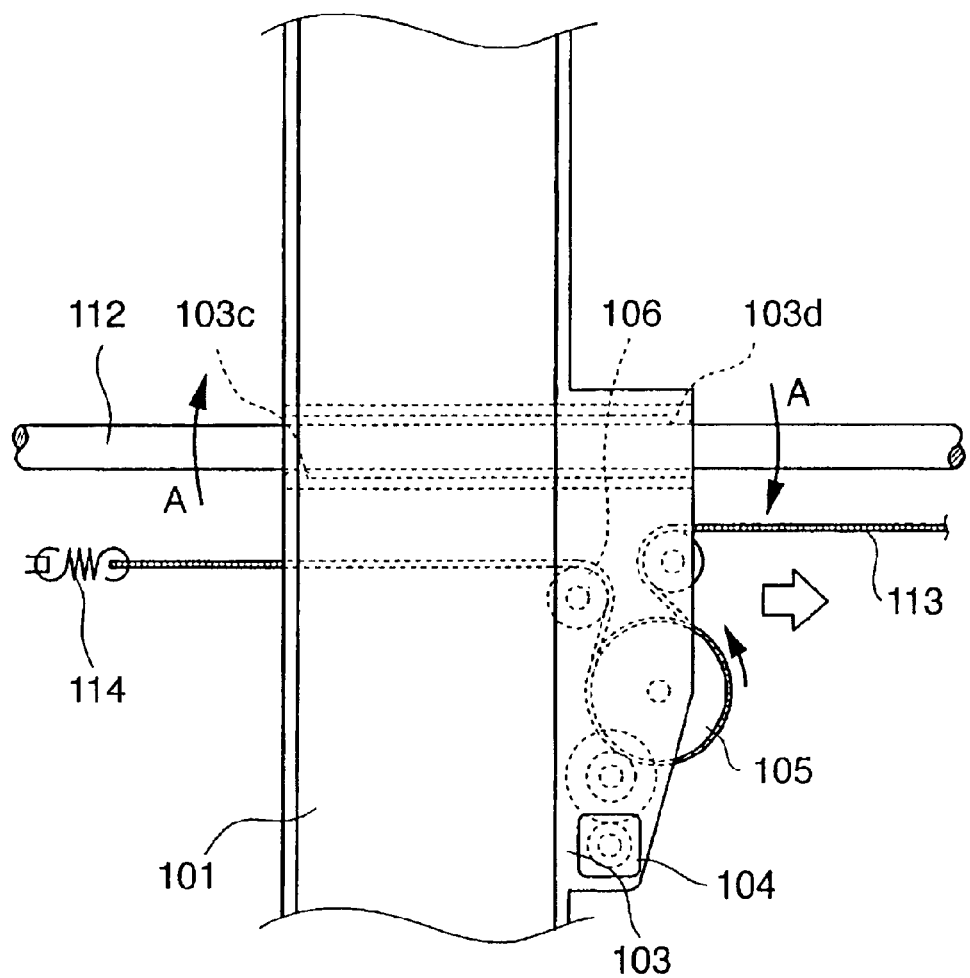
FIG. 13 is a plan view showing the main part of a driving system in the conventional image reading apparatus.
Figure 14:
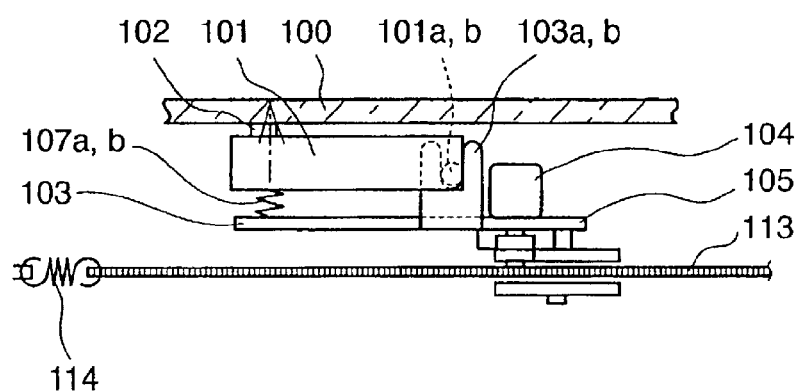
FIG. 14 is a front view of FIG. 13.
Figure 15:
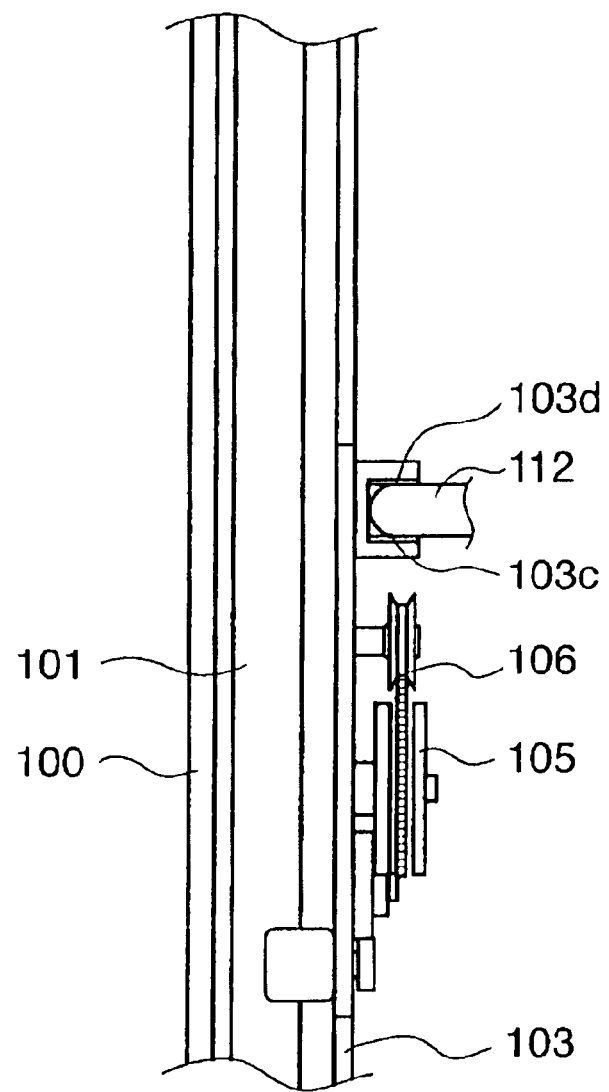
FIG. 15 is a right side view of FIG. 13.

FIG. 9 is a block diagram of a read image data process performed by the image reading apparatus. An image output signal read by the image sensor 101S in synchronism with the LEDs that are sequentially flashed is sent to an amplifier 121 and amplified by it, and is converted by an A/D converter 122 into a digital image signal. The A/D converter 122 divides the dynamic range (read output difference between the white portion and black portion on the original) of the image sensor 101S to correspond in number to the bits of the digital image signal, and assigns the number of gray levels to the brightness of the image of the original.

For example, when an A/D converter with an 8-bit resolution is used, a range from white to black can be discriminated with 256 gray levels. When an A/D converter with a 10-bit resolution is used, the range can be discriminated with 1,024 gray levels. Therefore, by color reading with R, G, and B three light sources, an image reading apparatus using an 8-bit A/D converter can discriminate 24 bits=about 16,700,000 colors, and an image reading apparatus using a 10-bit A/D converter can discriminate 30 bits=about 1,074,000,000 colors.

The image signal can be output from the image reading apparatus in several manners, and how the image signal is to be output can be selected in accordance with the use of the read image. When a sentence is to be read and the read contents are to be used with an OCR, or when a monochromatic line drawing is to be read, a monochromatic binary image is appropriate. Image data which is obtained by binarizing an image signal, obtained by turning on, e.g., only the R light source of the R, G, and B light sources described above, with an image processing circuit incorporated in a gate array 123 with reference to a certain threshold is used.

When an image such as a photograph is to be read and output to a monochrome printer, image data which is obtained by binarizing an image signal obtained by the G light source in the similar manner in accordance with a halftone process such as dither method or error diffusion method is used. When a color image is to be processed, multilevel (e.g., 24 bits) image data is appropriate.

The image signal processed by the image processing circuit is output to a device 200, e.g., a personal computer, through an interface circuit 124.

As described above, according to this embodiment, the sensor holder 12 extends along the reading unit 11 in a direction perpendicular to the guide shaft 14, holds the reading unit 11 at its two ends 12a and 12b, and is pivotal with respect to the guide shaft 14. The spring 15 is provided between the reading unit 11, at one of two regions thereof, and the sensor holder 12, and biases the reading unit 11 through the sensor holder 12 toward the original glass table 10 over the two regions. Thus, the postures of the reading unit 11 and sensor holder 12 are uniquely determined, so that an urging pressure that is uniform on the right and left sides can be obtained.

More specifically, unlike in the prior art, the postures are not determined by the position where the weight of the springs at the two ends and the unit as a whole is balanced. Therefore, variations in biasing force for the original table are small, and the holding member can maintain its parallel posture regardless of the balance of its own weight.

Since the reading unit 11 can scan the original while always maintaining a constant distance between the surface of the original table 10 and the light-receiving surface of the image sensor 101S, it can obtain a stable scanning performance, so that a high-quality image reading apparatus can be provided.

The present invention is not limited to the above embodiments and various changes and modifications can be made within the spirit and scope of the present invention. Therefore, to apprise the public of the scope of the present invention the following claims are made.

What is claimed is:

1. An image reading apparatus with an image reading unit for reading image information of an original placed on one surface of an original table by scanning along the other surface of the original table, and a guide shaft provided at a position that divides the image reading unit into two substantially equal regions and adapted to guide the image reading unit in a scanning direction, comprising:

a holding member extending along the image reading unit in a direction perpendicular to the guide shaft, adapted to hold the image reading unit at two ends thereof, and pivotal about the guide shaft; and only one biasing member, provided between the image reading unit and said holding member at only one of the two regions, adapted to bias the image reading unit toward the original table at the only one of the two regions;

wherein the one region of the image reading unit provided with said biasing member is supported to be movable perpendicularly by said holding member.

2. The apparatus according to claim 1, wherein said holding member urges the other region of the image reading unit toward the original table by a biasing force of said biasing member transferred through a lever operation of the guide shaft to said holding member.

3. The apparatus according to claim 2, wherein the one region of the image reading unit is supported to be movable pivotally by said holding member and the other region of the image reading unit is pivotally supported by said holding member.

4. A method of supporting an image reading unit for reading image information of an original placed on one surface of an original table in an image reading apparatus by scanning along the other surface of the original table, comprising the steps of:

holding the image reading unit at two ends of a holding member, extending along the image reading unit in a direction perpendicular to a guide shaft provided at a position that divides the image reading unit into two substantially equal regions, and pivotal about the guide shaft, while guiding the image reading unit in a scanning direction with the guide shaft, and biasing the image reading unit toward the original table at only one of the two regions with only one biasing member provided between the image reading unit and the holding member at the only of the two regions, wherein the one region of the image reading unit provided with the biasing member is supported to be movable perpendicularly by the holding member.

5. The method according to claim 4, wherein the holding member urges the other region of the image reading unit toward the original table by a biasing force of the biasing member transferred through a lever operation of the guide shaft to the holding member.

6. The method according to claim 5, wherein one region of the image reading unit is supported to be movable pivotally by the holding member and the other region of the image reading unit is pivotally supported by the holding member.

* * * * *